Jan. 19, 1954 H. L. JOHNSON ET AL 2,666,849

SHORT-PULSE MODULATOR

Filed Oct. 12, 1945 2 Sheets-Sheet 1

INVENTORS
HAROLD L. JOHNSON
VERNAL JOSEPHSON
BY
[signature]
ATTORNEY

Jan. 19, 1954 H. L. JOHNSON ET AL 2,666,849

SHORT-PULSE MODULATOR

Filed Oct. 12, 1945 2 Sheets-Sheet 2

INVENTORS
HAROLD L. JOHNSON
VERNAL JOSEPHSON
BY
Ralph L. Chappell
ATTORNEY

Patented Jan. 19, 1954 2,666,849

UNITED STATES PATENT OFFICE 2,666,849

SHORT-PULSE MODULATOR

Harold L. Johnson, Pasadena, Calif., and Vernal Josephson, Cambridge, Mass.

Application October 12, 1945, Serial No. 622,053

7 Claims. (Cl. 250—27)

This invention relates to modulator or pulse forming circuits for radar transmitting equipment and in particular to a modulator having a shock excited L-C circuit with heavy damping after the first positive swing which drives a bootstrap driver beyond saturation to produce a square-topped very narrow pulse.

To obtain with a radar system better definition of targets and better range resolution or separation of close targets it is desirable to be provided with a very short transmitted pulse output which in turn requires that the transmitting magnetron be provided with a short flat-topped pulse from a modulator or pulse forming circuit. Earlier modulator systems employed delay lines, so called, which stored up energy between pulses and released it when triggered in the form substantially of a square wave or flat-topped pulse output. The present invention produces a single narrow flat top pulse by saturation clipping of the high amplitude very narrow first positive swing of a shock excited L-C circuit, and by almost completely damping the remaining oscillations of the L-C circuit. This narrow pulse is then used to feed a driver amplifier capable of furnishing the required power at the proper voltage to the magnetron with which it is being used.

It is the principal object of this invention to provide a modulator circuit for producing high amplitude flat topped pulses of very short duration with a steep leading and trailing edge whenever the circuit is triggered.

It is another object to produce narrow rectangular pulses by use of a shock-excited and damped L-C circuit and an overdriven amplifier.

Other objects and features may be found in the following detailed description when taken with the figures.

Figure 1:
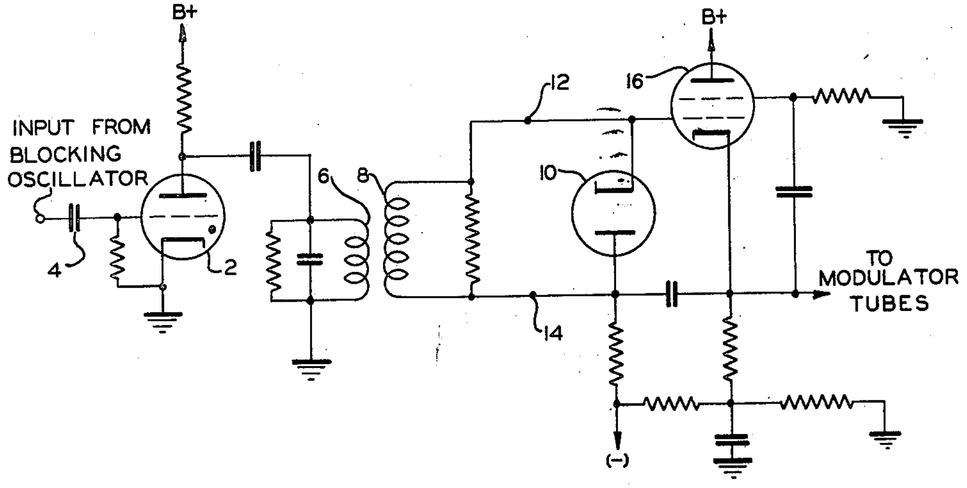
Fig. 1 is a circuit diagram for illustrating the principle of the invention.

Referring now to Fig. 1 there is shown a thyratron tube 2. A large fast rising voltage pulse is applied to the grid of this tube 2 through coupling capacitor 4 from blocking oscillators (not shown) triggered at the desired repetition rate. This minimizes the delay in firing time as well as range jitter due to variations in firing time. This variation of the delay in firing time should be relatively small compared to the pulse width.

When a pulse is desired, the blocking oscillator (not shown) triggers the thyratron 2 causing a large current to flow through inductor 6 which is wound on the same form as inductor 8 for close mutual coupling between these two inductors. The inductor 8 is designed to tune with stray and tube capacitances to a wave length which is approximately twice the desired pulse length. For instance, for a 0.1 microsecond pulse the frequency would be 5 megacycles per second, and for a pulse .03 microsecond long the frequency would be about 17 megacycles per second. The primary is tuned to a considerably lower frequency and is damped.

The current in inductor 8 would normally take the form of damped oscillations but there is included a diode 10 across the secondary inductor 8 which damps this resonant circuit very heavily on the negative swing. The inductor coils 6 and 8 are connected in such a manner that the first swing is positive. When point 12 becomes positive with respect to point 14, the diode 10 is inoperative and this positive swing excites a driver tube 16.

Figure 2:
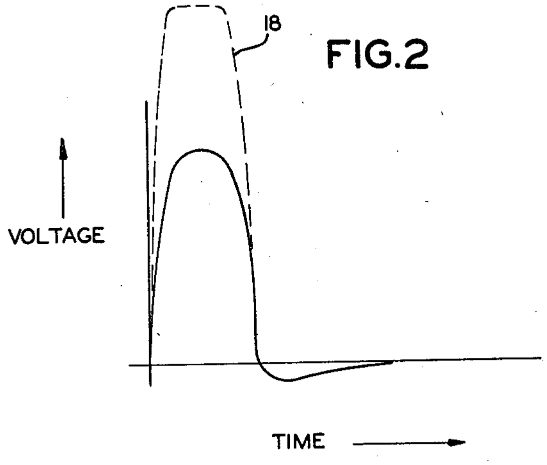
Fig. 2 is a wave form showing substantially the shape of the pulse going into the driver stage, and showing the output pulse.

In Fig. 2 there is shown an approximation of the wave form at point 12. By using this pulse to drive a boot strapped driver tube 16 beyond saturation the resulting output can be made square topped as shown in Fig. 2 by the dotted line 18. The boot strapped driver including the tube 16 is simply a cathode loaded amplifier where the input is coupled directly across the grid and the cathode and the cathode is returned to ground or other reference potential point through a cathode load impedance. The term "boot strapped" has been used because an increase of grid voltage increases the cathode voltage and the cathode voltage rise further increases the grid to ground voltage.

The output pulse 18 is fed directly to the grids of a pair of modulator tubes (not shown in Fig. 1). The output from the plates of these tubes is fed to the magnetron (not shown).

Figure 3:
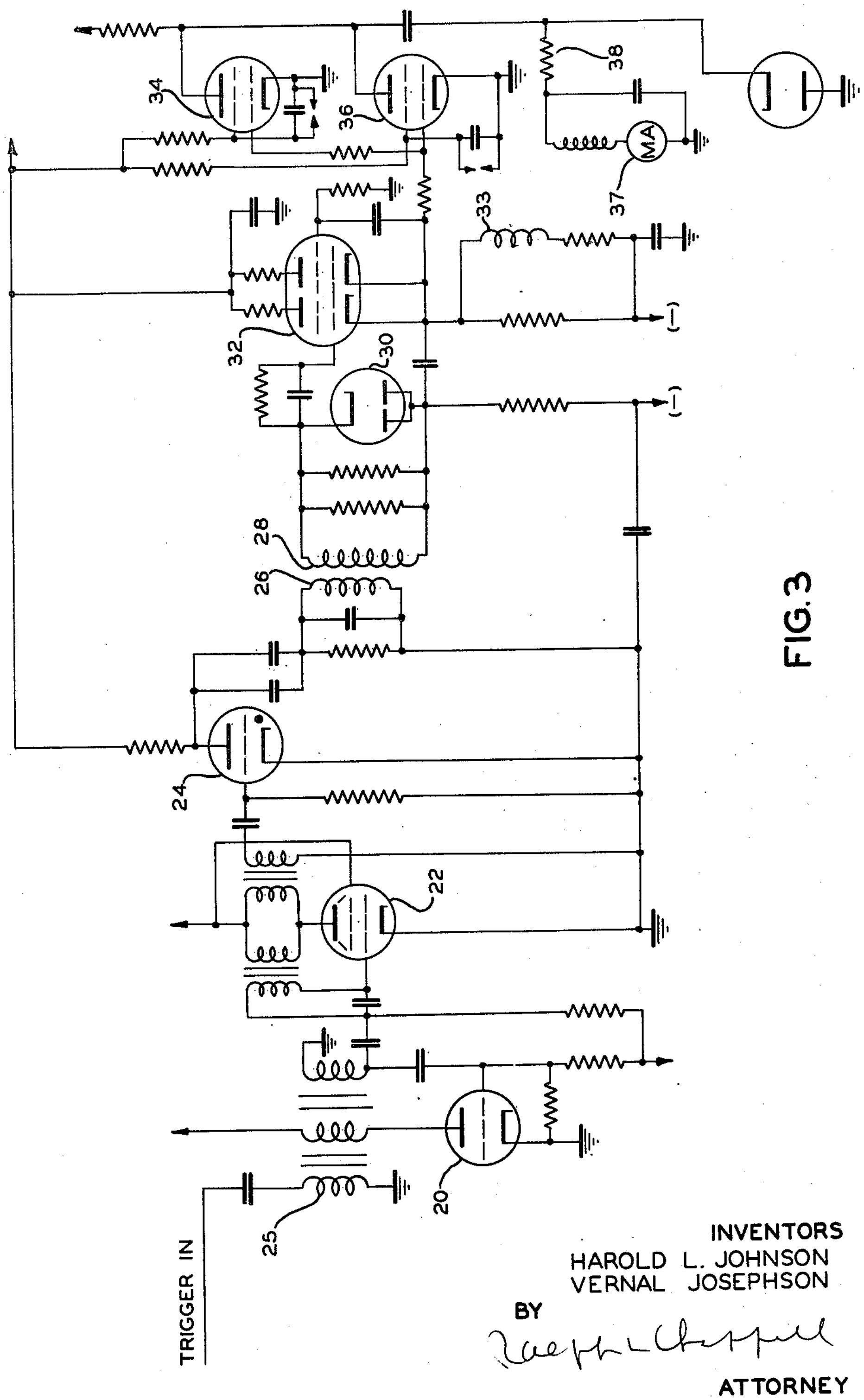
Fig. 3 is a complete circuit diagram of one embodiment of the invention.

Fig. 3 shows the complete circuit diagram of a short pulse modulator comprising two blocking oscillators 20 and 22 connected in series which produce a sharply rising trigger pulse on the grid of a thyratron tube 24 in response to a positive trigger input to the primary 25 of the first blocking oscillator transformer. This causes tube 24 to conduct sharply causing current to flow through the primary inductor 26 which is closely coupled to secondary inductor 28.

Inductor 28 is tuned to resonate with the stray and tube capacitances at a frequency such that the first half cycle of oscillation approximates the desired pulse length. Across the tuned L-C circuit 28 is a diode 30 which almost completely damps out the succeeding negative swing and oscillations which would normally follow.

The first positive swing is fed to the grid of a tetrode tube 32, sending it beyond saturation so as to produce a square topped wave. This stage is a boot strapped driver with an output to a pair of modulator tubes 34 and 36 in parallel whose plate pulse is employed to drive a magnetron (not shown). Also included in the magnetron circuit are a meter 37 for measuring the magnetron current and a damping resistor 38 for preventing overshoots of the magnetron exciting pulse. In the cathode circuit of the driver tube 32 is included a peaking inductor 33 which assists in squaring the pulse by decreasing the rise time of the leading edge. The value of inductance 33 must be carefully chosen to accomplish this without at the same time producing a spike on the leading edge which would be detrimental to smooth magnetron operation.

Whereas the earlier systems for producing modulator pulses did so either by discharging or by charging delay lines it is seen that an entirely different principle is employed in this invention, namely the saturation squaring of a high amplitude short pulse from a resonant circuit, which circuit is shocked by a quickly rising current triggered by blocking oscillators.

A very short pulse of good shape is produced with great stability in its duration and in its timing of response to the initial trigger. While specific circuits have been shown the principle of the invention is broader than these specific circuits and the invention should not be deemed limited thereby, but only by the prior art and the spirit of the appended claims.

What is claimed is:

1. A circuit for producing a short duration rectangular pulse for energizing a modulator having a number of modulator tubes, said circuit comprising a switch tube having at least a control grid, a blocking oscillator for producing a sharply increasing voltage on the control grid of said switch tube in response to an input trigger, a primary inductor energized by the operation of said switch tube, a secondary inductor closely coupled to said primary inductor and adapted to resonate with stray and tube capacitances at a wave length substantially double the desired modulator pulse length, a diode across said secondary inductor for damping out all oscillation subsequent to the first positive voltage swing of said secondary circuit, and a boot strapped driver tube for driving said modulator tubes, and itself adapted to be driven beyond saturation by said positive voltage swing for amplifying and squaring said positive voltage swing, said modulator tubes being adapted to be activated by said amplified and squared output from said driver to produce a pulse adapted to energize a magnetron.

2. A circuit for producing a short duration rectangular pulse for energizing a modulator having a number of modulator tubes, said circuit comprising a switch tube responsive to an input trigger, a primary inductor energized by the operation of said switch tube, a secondary inductor closely coupled to said primary inductor and adapted to resonate with stray and tube capacitances at a wave length substantially double the desired modulator pulse length, means for damping all oscillation in said secondary circuit following the initial positive voltage swing, and a boot strapped driver tube energized by said positive voltage swing to beyond saturation for amplifying and squaring said positive voltage swing, said modulator tubes being adapted to be energized by said amplified and squared pulse to produce a pulse adapted to energize a magnetron.

3. A circuit for producing a short duration rectangular pulse for energizing a modulator having a number of modulator tubes, said circuit comprising a switch tube having at least a control grid, a plurality of blocking oscillators in series for producing a sharply increasing voltage on the control grid of said switch tube in response to an input trigger, a primary inductor energized by the operation of said switch tube, a secondary inductor closely coupled to said primary inductor and adapted to resonate with stray and tube capacitances at a wave length substantially double the desired modulator pulse length, a diode for damping out all oscillation subsequent to the first positive voltage swing of said secondary circuit, and a boot strapped driver tube for driving said modulator tubes, and itself adapted to be driven beyond saturation by said positive voltage swing for amplifying and squaring said positive voltage swing, said modulator tubes being adapted to be activated by said amplified and squared output from said driver to produce a pulse adapted to energize a magnetron.

4. A circuit for producing a short duration rectangular pulse for energizing a modulator having a number of modulator tubes, said circuit comprising a switch tube having at least a control grid, a plurality of blocking oscillators in series for producing a sharply increasing voltage on the control grid of said switch tube in response to an input trigger, a primary inductor energized by the operation of said switch tube, a secondary inductor closely coupled to said primary inductor and adapted to resonate with stray and tube capacitances at a wave length substantially double the desired modulator pulse length, means for damping out all oscillation subsequent to the first positive voltage swing of said secondary circuit, and a boot strapped driver tube for driving said modulator tubes, and itself adapted to be driven beyond saturation by said positive voltage swing for amplifying and squaring said positive voltage swing, said modulator tubes being adapted to be activated by said amplified and squared output from said driver to produce a pulse adapted to energize a magnetron.

5. A circuit for producing a short duration rectangular pulse for energizing a modulator having a number of modulator tubes, said circuit comprising a switch tube having at least a control grid, a plurality of blocking oscillators in series for producing a sharply increasing voltage on the control grid of said switch tube in response to an input trigger, a primary inductor energized by the operation of said switch tube, a secondary inductor closely coupled to said primary inductor and adapted to resonate with stray and tube capacitances at a wave length substantially double the desired modulator pulse length, a diode for damping out all oscillation subsequent to the first positive voltage swing of said secondary circuit, and a boot strapped driver tube for driving said modulator tubes, and itself adapted to be driven beyond saturation by said positive voltage swing for amplifying and squaring said positive voltage swing.

6. A circuit for producing a short duration rectangular pulse for energizing a modulator having a number of electron tubes, said circuit comprising, a thyratron tube responsive to a trigger pulse, a primary inductor energized by the discharge of said thyratron, a second inductor closely coupled to said primary inductor and adapted to resonate with stray and tube capacitances at a wave length substantially double the desired modulator pulse length, said first and second inductors being connected in such a manner that the first voltage swing across said second inductor is positive, a diode connected across said second inductor for damping out all oscillation subsequent to the first positive voltage swing across said secondary inductor, and a boot strapped driver circuit energized by said positive voltage swing for driving said modulator tubes, and itself being adapted to be driven beyond saturation by said positive voltage swing for amplifying and squaring said positive voltage swing, said modulator tubes being adapted to be activated by said amplified and squared output from said driver to produce a pulse adapted to energize a magnetron.

7. A modulator circuit for producing a short duration rectangular pulse for energizing a tube of a modulator comprising, a switch tube having at least a control grid, a plurality of blocking oscillators in series for producing a sharply increasing voltage on the control grid of said switch tube in response to an input trigger, a primary inductor energized by the operation of said switch tube, a secondary inductor coupled to said primary inductor and adapted to resonate with stray and tube capacitances at a wave length substantially double the desired modulator pulse length, a diode for damping out all oscillation subsequent to the first positive voltage swing of said secondary circuit, and a boot strapped driver circuit energized by said first positive voltage swing for driving said modulator tube, said boot strapped driver circuit comprising an electron tube having at least an anode, a control grid and a cathode, a point of reference potential, a source of potential positive with respect to said reference point and connected to said anode, a cathode load impedance connected between said cathode and said reference point and means for coupling said positive voltage swing between said cathode and said control grid of said boot strapped driver tube, said positive voltage swing having a sufficiently high amplitude to drive said boot strapped driver tube beyond saturation whereby said positive voltage swing appears amplified and squared across said cathode load impedance.

HAROLD L. JOHNSON.
VERNAL JOSEPHSON.

References Cited in the file of this patent

UNITED STATES PATENTS

| Number | Name | Date |
|---|---|---|
| 2,153,202 | Nichols | Apr. 4, 1939 |
| 2,154,783 | Stromeyer | Apr. 18, 1939 |
| 2,237,661 | Ernst | Apr. 8, 1941 |
| 2,244,003 | Eaglesfield et al. | June 3, 1941 |
| 2,255,882 | Hathaway | Sept. 16, 1941 |
| 2,408,061 | Grieg | Sept. 24, 1946 |
| 2,439,324 | Walker | Apr. 6, 1948 |
| 2,440,278 | Labin et al. | Apr. 27, 1948 |
| 2,468,058 | Grieg | Apr. 26, 1949 |
| 2,605,409 | Forbes | July 29, 1952 |

OTHER REFERENCES

Principles of Radar—M. I. T. Staff, First Edition, 1944, pages 6–55. Copy in Library of Congress.

Principles of Radar—M. I. T. Staff, 2nd edition, 1946, pages 6–53.